(12) United States Patent
Watanabe

(10) Patent No.: US 10,191,266 B2
(45) Date of Patent: Jan. 29, 2019

(54) THREE-DIMENSIONAL SHAPE MEASURING APPARATUS

(71) Applicant: OLYMPUS CORPORATION, Hachioji-shi, Tokyo (JP)

(72) Inventor: Hideo Watanabe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 73 days.

(21) Appl. No.: 15/391,818

(22) Filed: Dec. 27, 2016

(65) Prior Publication Data

US 2017/0212341 A1 Jul. 27, 2017

(30) Foreign Application Priority Data

Jan. 25, 2016 (JP) .................. 2016-011570

(51) Int. Cl.
| | | |
|---|---|---|
| *G06F 17/50* | (2006.01) | |
| *G02B 21/00* | (2006.01) | |
| *H04N 13/254* | (2018.01) | |
| *H04N 13/296* | (2018.01) | |
| *G01B 11/24* | (2006.01) | |
| *G02B 21/08* | (2006.01) | |
| *G02B 26/10* | (2006.01) | |

(52) U.S. Cl.
CPC .......... *G02B 21/0084* (2013.01); *G01B 11/24* (2013.01); *G02B 21/0016* (2013.01); *G02B 21/0028* (2013.01); *G02B 21/08* (2013.01); *G02B 26/101* (2013.01); *H04N 13/254* (2018.05); *H04N 13/296* (2018.05)

(58) Field of Classification Search
CPC ............ G02B 21/0084; G02B 21/0016; G02B 21/0028; G02B 26/101; G02B 21/08; H04N 13/296; H04N 13/254; H04N 13/0296; H04N 13/0253; G01B 11/24
See application file for complete search history.

(56) References Cited

U.S. PATENT DOCUMENTS

2003/0232380 A1 12/2003 Maruyama
2011/0305898 A1* 12/2011 Zhang .................... A61L 27/34
428/336

(Continued)

FOREIGN PATENT DOCUMENTS

| JP | 11072308 A | 3/1999 |
|---|---|---|
| JP | 2004020433 A | 1/2004 |
| JP | 3847422 B2 | 11/2006 |

*Primary Examiner* — Sathyanaraya V Perungavoor
*Assistant Examiner* — Howard D Brown, Jr.
(74) *Attorney, Agent, or Firm* — Holtz, Holtz & Volek PC

(57) ABSTRACT

A three-dimensional shape measuring apparatus includes a light source, an optical sensor, and an imaging unit that images a sensor signal. The three-dimensional shape measuring apparatus includes: a storing unit that stores control information indicating a state of the three-dimensional shape measuring apparatus at a point in time of imaging, the control information being obtained in synchronization with the imaging of the sensor signal performed by the imaging unit; and an output control unit that controls a transfer timing of the control information stored in the storing unit in accordance with a transfer timing of image data obtained by the imaging unit so as to output the control information to an image transfer path in association with the image data.

12 Claims, 11 Drawing Sheets

(56) References Cited

U.S. PATENT DOCUMENTS

| | | | | |
|---|---|---|---|---|
| 2012/0142554 A1* | 6/2012 | Zhang | ................ | G01N 33/543 |
| | | | | 506/9 |
| 2013/0212749 A1* | 8/2013 | Watanabe | ............. | G01O 10/04 |
| | | | | 850/4 |
| 2013/0262027 A1* | 10/2013 | Shishido | ............... | G01B 15/04 |
| | | | | 702/155 |
| 2014/0358270 A1* | 12/2014 | Sudo | ..................... | C03B 19/095 |
| | | | | 700/98 |
| 2016/0275689 A1* | 9/2016 | Fujii | ..................... | G01B 11/24 |

* cited by examiner

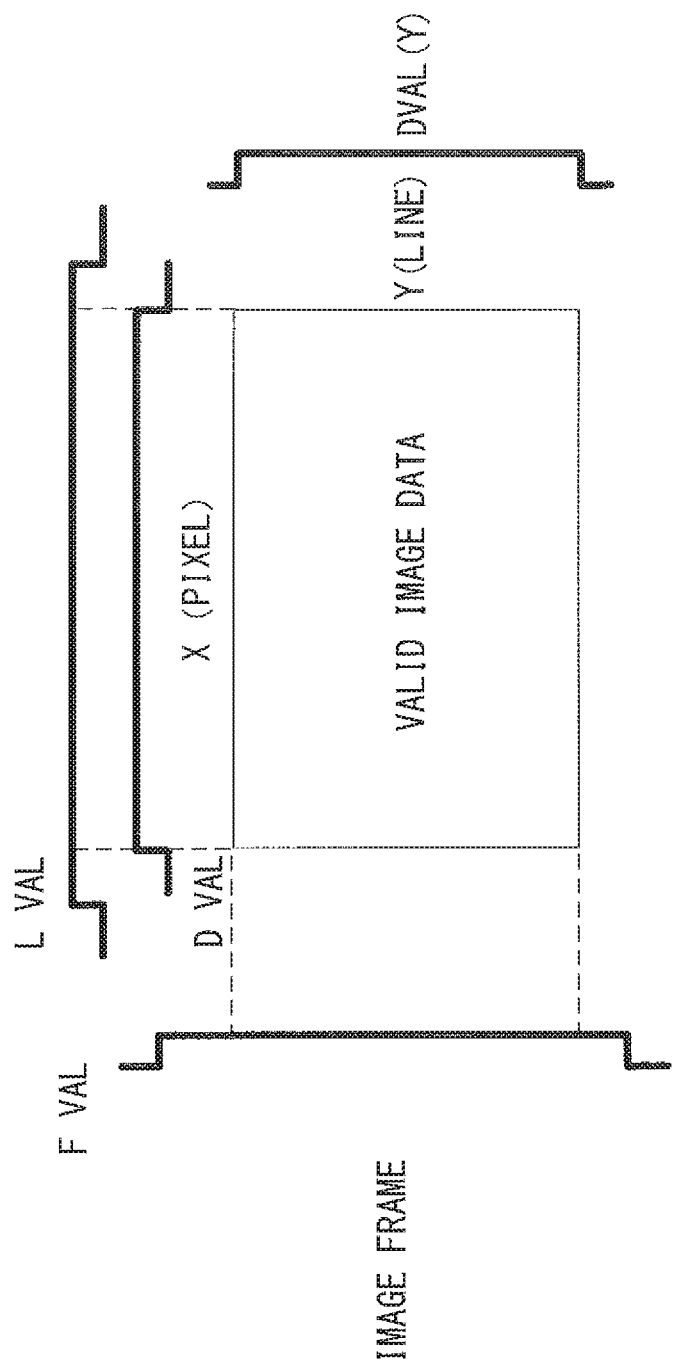
F I G. 2

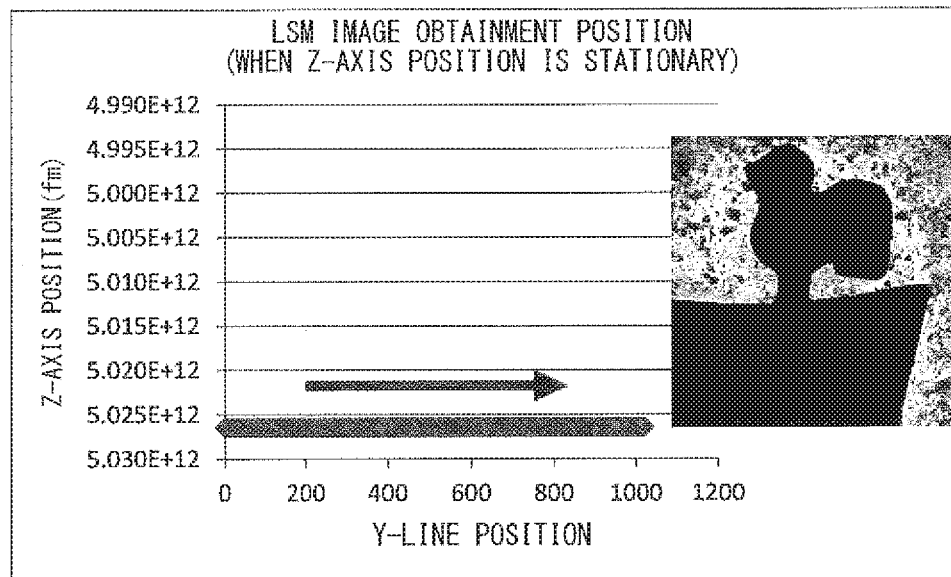
F I G. 6 A
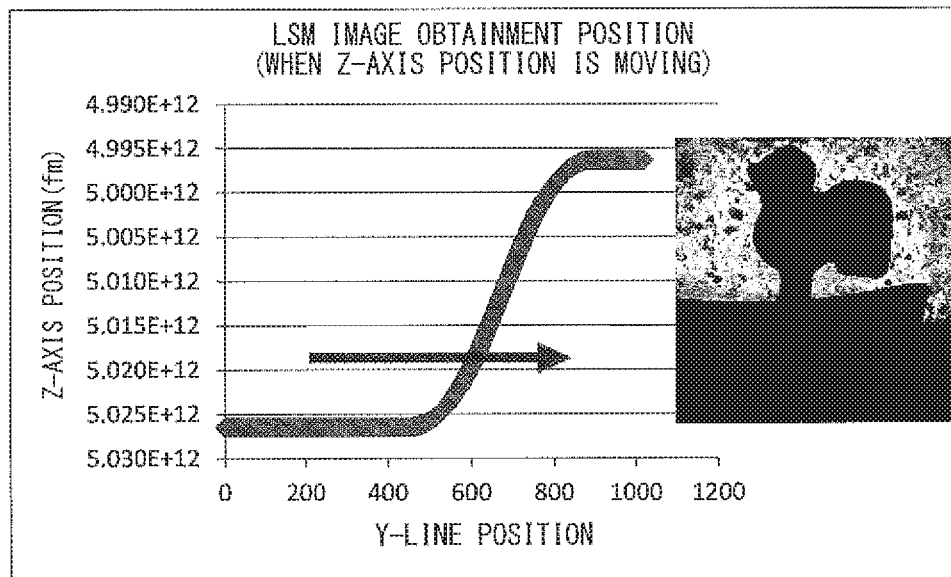
F I G. 6 B

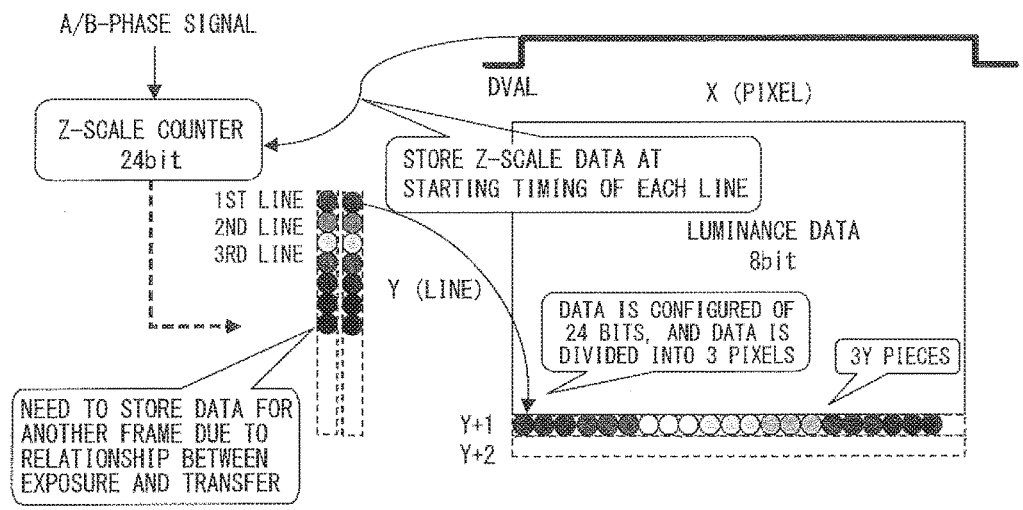
FIG. 7A
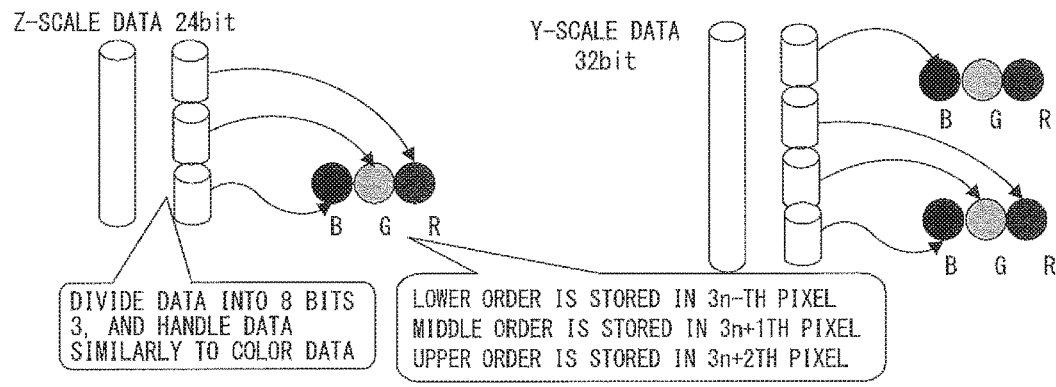
FIG. 7B <Z-SCALE>
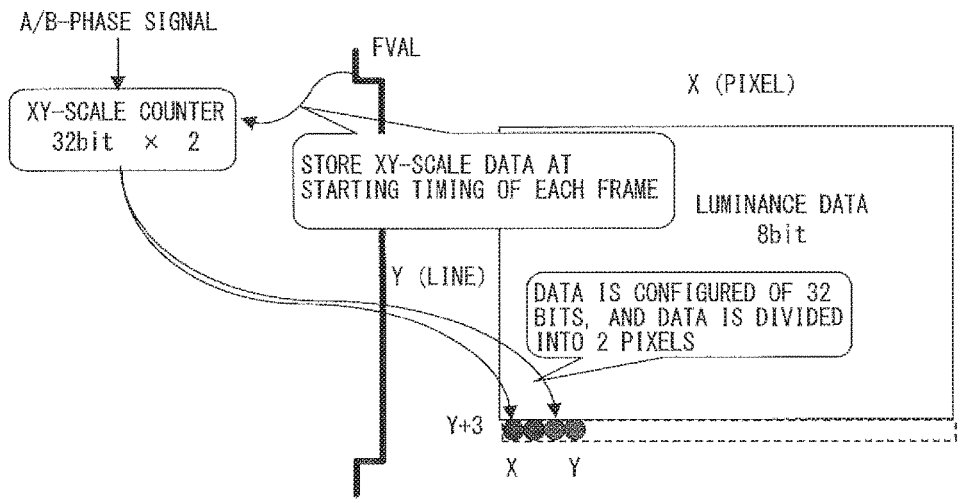
FIG. 7C <XY-SCALE>

F I G. 1 0 A
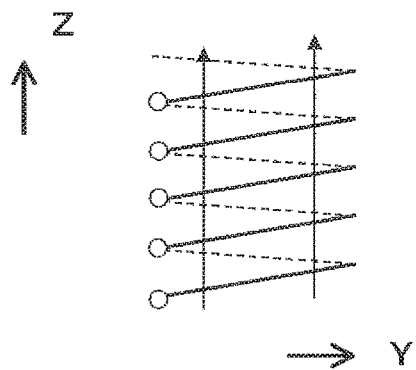
F I G. 1 0 B
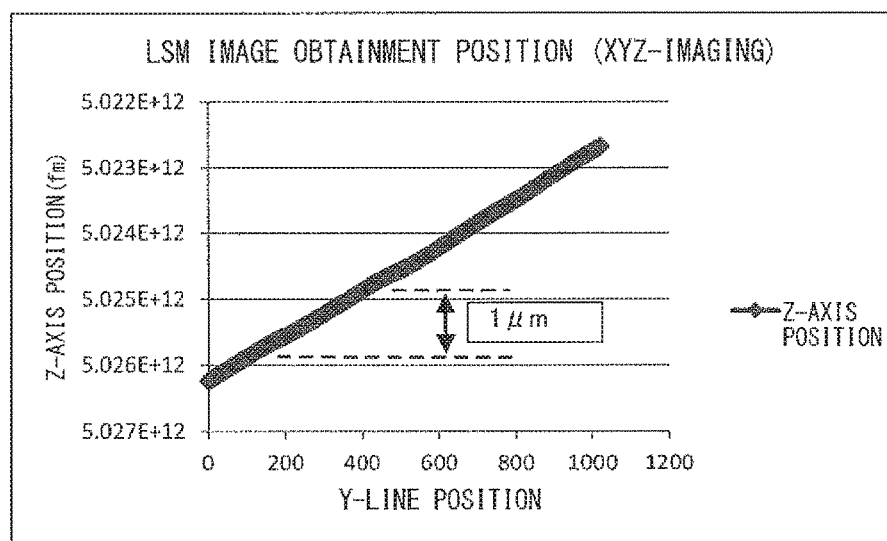

THREE-DIMENSIONAL SHAPE MEASURING APPARATUS

CROSS REFERENCE TO RELATED APPLICATIONS

This application is based upon and claims the benefit of priority from the prior Japanese Patent Application No. 2016-11570, filed Jan. 25, 2016, the entire contents of which are incorporated herein by this reference.

BACKGROUND OF THE INVENTION

Field of the Invention

The present invention relates to a three-dimensional shape measuring apparatus that measures a three-dimensional shape of a specimen on the basis of a microscope image.

Description of the Related Art

It is important to measure three-dimensional shapes of micro components or areas in order to reduce the size of an industrial product and to sophisticate the industrial product. In order to manage the quality of electronic components or materials, the geometric shapes of the surfaces of the electronic components are measured, and the geometric shapes are quantified.

As a method for measuring the geometric shape of the surface of a specimen such as a component, a method using a stylus-type surface roughness measuring machine has been used. In this method, the shape of an object to be measured is measured by precisely tracing the surface of the object to be measured by using the tip of a mechanical stylus, and therefore highly reliable data can be obtained.

Meanwhile, non-contact measuring machines using various measurement principles have been widely used. By using the non-contact measuring machines, an object to be measured can be easily measured without being damaged, and therefore the non-contact measuring machines have been spread rapidly in recent years. Many of the non-contact measuring machines use an optical technique. A representative example of a commercially available non-contact measuring machine is confocal microscopy.

A basic principle of measurement by using confocal microscopy is described below.

As the confocal microscopy, a laser scanning confocal microscope described in Japanese Patent No. 3847422 is publicly known.

A laser scanning microscope two-dimensionally scans a specimen with a laser beam that has been condensed in a spot shape by using an objective, and the laser scanning microscope receives reflected light via a confocal diaphragm that is arranged in a position conjugate to a focal position of the objective. The confocal diaphragm only receives light of a focused portion, and therefore only the focused portion is imaged. The obtained image has a smaller depth of focus than that of a normal optical microscope, and the obtained image is generally referred to as a confocal image.

A small depth of focus is used to measure the surface shape of a specimen in confocal microscopy. Namely, a plurality of confocal images having a small depth of focus are captured while a relative distance between an objective and the specimen is being changed. By obtaining a position in a Z-axis direction that provides a maximum luminance in each pixel position of an image, namely, a focusing position, the surface shape of the entirety of the specimen is measured.

FIG. 8 illustrates a curve called an I-Z curve. The I-Z curve indicates a relationship between a relative distance Z between an objective and a specimen and an intensity I of light reflected by the specimen. As illustrated by the I-Z curve of FIG. 8, when a focal position of the objective matches a surface position of the specimen, light has the largest intensity.

In Japanese Laid-Open Patent Publication No. 2004-020433, for example, a method for obtaining a focusing position in each of the pixel positions from the plurality of confocal images above has been proposed. In this method, an intensity I of light reflected from a specimen with respect to a relative distance Z between an objective and the specimen is obtained in each discrete position in such a way that a measurement accuracy and a measurement time are not an exchange condition, an I-Z curve approximate curve is formed, and a surface position of the specimen is estimated.

SUMMARY OF THE INVENTION

In an aspect of the present invention, a three-dimensional shape measuring apparatus includes a light source, an optical sensor, and an imaging unit that images a sensor signal. The three-dimensional shape measuring apparatus includes: a storing unit that stores control information indicating a state of the three-dimensional shape measuring apparatus at a point in time of imaging by the imaging unit, the control information being obtained in synchronization with the imaging of the sensor signal performed by the imaging unit; and an output control unit that controls a transfer timing of the control information stored in the storing unit in accordance with a transfer timing of image data obtained by the imaging unit so as to output the control information to an image transfer path in association with the image data.

BRIEF DESCRIPTION OF THE DRAWINGS

The present invention will be more apparent from the following detailed description when the accompanying drawings are referenced.

FIG. 2 illustrates a relationship between a synchronization signal generated by a scanning control unit and image data generated by a sampling/memory unit.

FIG. 4A illustrates a state in which a value of focal position data in each line is divided and stored. FIG. 4B illustrates the order of storing of the divided value of the focal position data.

FIGS. 6A and 6B are other diagrams explaining an effect of a method for measuring a three-dimensional shape by using the laser scanning confocal microscope according to the first embodiment. FIG. 6A illustrates a relationship between a position coordinate in a Z-axis direction and a line position of an image in a case in which a focal position is stationary.

FIG. 6B illustrates a relationship between a position coordinate in a Z-axis direction and a line position of an image in a case in which a focal position is moving.

FIGS. 7A, 7B, and 7C illustrate specific examples of a method for storing a focal position and XY coordinates in a DPRAM and a method for outputting the focal position and the XY coordinates to an image transfer path that are performed by a sampling/memory unit according to a second embodiment. FIG. 7A illustrates a state in which a value of focal position data in each line is divided and stored. FIG. 7B illustrates the order of storing of values of the divided focal position data and XY-scale data. FIG. 7C illustrates a state in which a value of the XY-scale data is divided and stored.

FIGS. 10A and 10B are diagrams (no. 1) explaining deviation between a change in a theoretical focal position and a change in an actual focal position. FIG. 10A illustrates a state in which control is performed to move a focal position at an equal speed by using a drive mechanism. FIG. 10B illustrates an amount of a change in the focal position.

DESCRIPTION OF THE EMBODIMENTS

Figure 9:
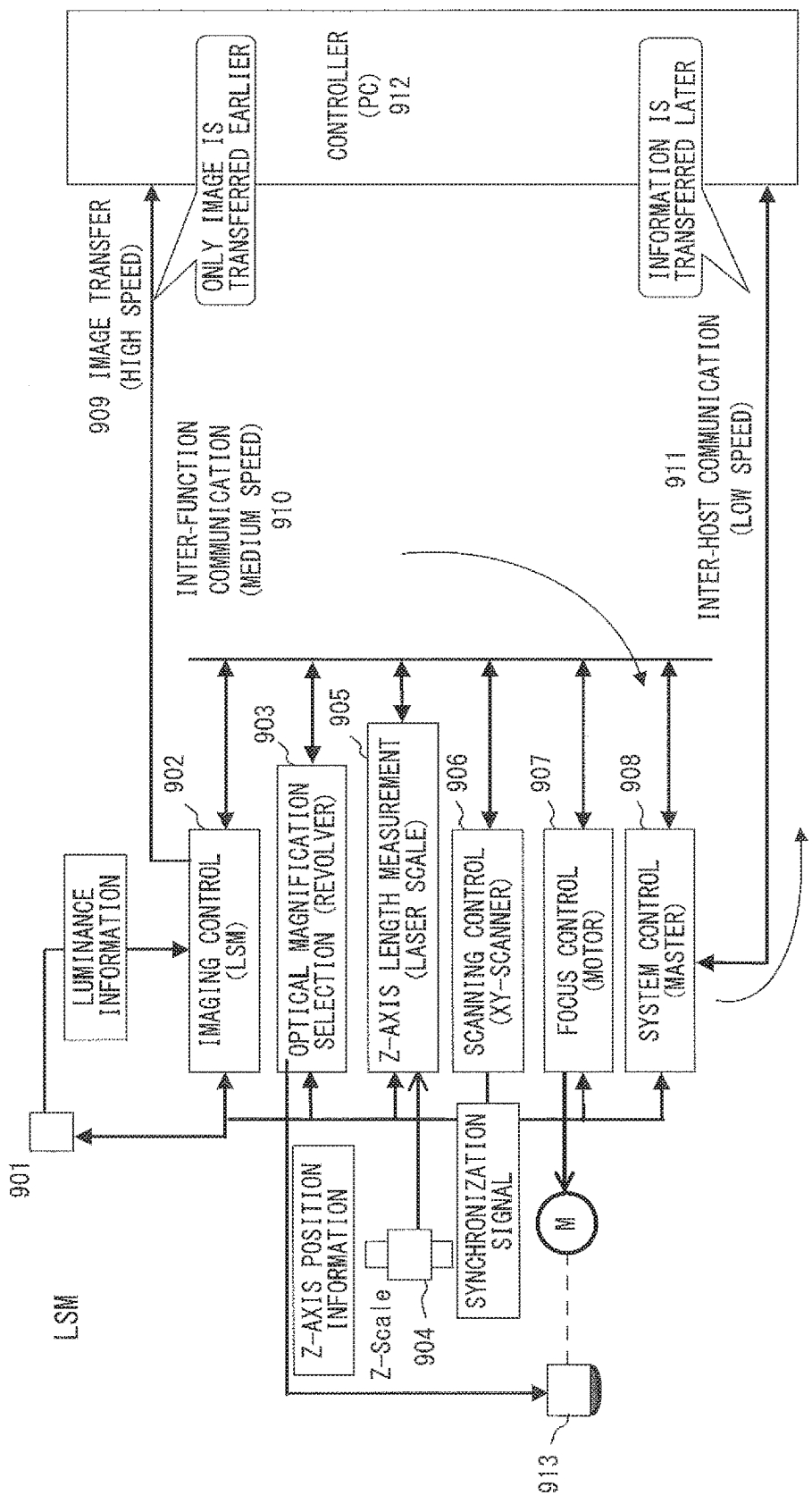
FIG. 9 illustrates an example of the internal configuration of a conventional laser scanning confocal microscope.

FIG. 9 illustrates an example of the internal configuration of a conventional laser scanning confocal microscope.

In the laser scanning confocal microscope illustrated in FIG. 9, a signal from an optical sensor 901 that detects laser reflected light from a specimen is sampled as pixel data by an imaging control unit 902 in accordance with a synchronization signal that a scanning control unit 906 outputs at a timing that matches laser scanning. The pixel data is collected for each line of laser horizontal scanning, and is further collected for each line of laser vertical scanning. Image data of one frame that has been collected for each of the vertical scanning lines of laser is immediately transferred to a controller 912 via a wide-band image transfer path 909 that can transfer data at a high speed, and the image data is displayed as an image.

A focal position of an objective 913 for which movement is controlled by a focus control unit 907 is always grasped as position information by a Z-axis length measuring unit 905 by using a Z-scale 904. As the Z-scale 904, a laser scale is used, for example. The Z-scale 904 detects a position in an optical axis direction (a Z-axis direction), and the Z-axis length measuring unit 905 stores the position information detected by the Z-scale 904 by using a position counter or the like.

Here, the synchronization signal used to sample pixel data is also given to the Z-axis length measuring unit 905. Accordingly, the laser scanning confocal microscope can store a value of the position counter of the Z-axis length measuring unit 905 at a prescribed timing by using the synchronization signal, and can store the value as a Z-axis position at the time of obtaining a confocal image of each frame. In a method relating to a conventional technology, position information in a Z-axis direction for each of the frames, namely, a prescribed number of pieces of position information in the Z-axis direction that corresponds to the number of confocal images, are stored, and are transferred to the controller 912 via an inter-function channel 910 or an inter-host channel 911. The controller 912 uses the received position information in processing for estimating a peak of the I-Z curve above so as to generate a three-dimensional shape.

As described above, an optical sensor that generates pixel data of a confocal image is separate from a position sensor that obtains an imaging position of the confocal image (a focal position of the objective 913). Accordingly, a memory that stores information, an amount of information and the form of information, a timing at which information is collected by the controller 912, or the like is generally different between the optical sensor and the position sensor. The controller 912 can obtain image data via the image transfer path 909 at a high speed in real time. The controller 912 receives corresponding position information via another channel such as the inter-host channel 911. The inter-function channel 910 or the inter-host channel 911 that is used to transfer position information has a narrower band than that of the image transfer path 909 that is used to transfer image data, and therefore the controller 912 receives the position information after reception of the image data. It is assured that the position information was stored at the same time as the image data, but the position information is processed in association with the image data only after all pieces of data have been collected in the controller 912.

A band is greatly different between an image transfer system and a communication system. Accordingly, the conventional configuration above has a problem wherein the speeding-up of processing for generating a three-dimensional shape is restricted by the band of the communication system such that the processing is speeded up only to a prescribed speed.

A relative distance between the objective 913 and a specimen is changed, for example, by using a method for performing a continuous operation at an equal speed while imaging in order to improve a drive efficiency of the movement of a focal position. Raster scanning is principally employed for laser scanning. Accordingly, a focal position of the objective 913 gradually moves while pixel data is being sampled from an upper-left portion to a lower-right portion of an image.

Figure 11:
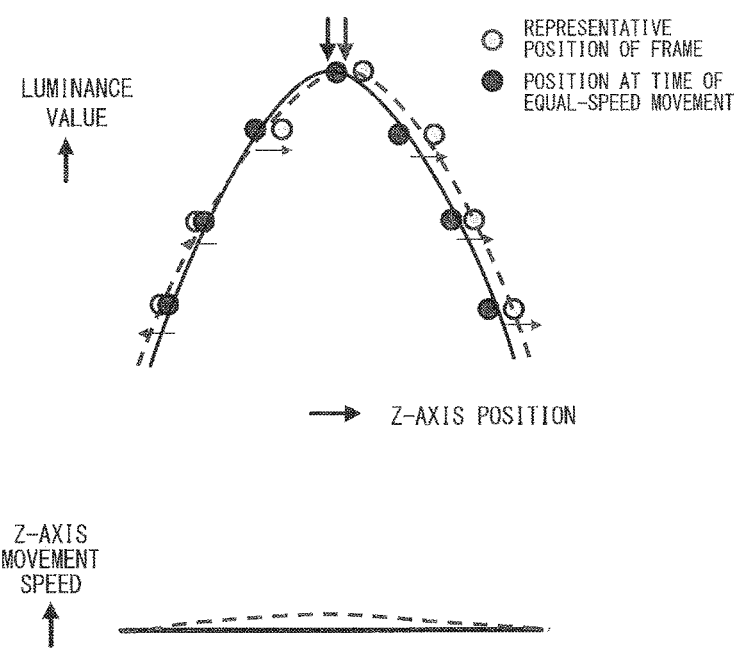
FIG. 11 is a diagrams (no. 2) explaining deviation between a change in a theoretical focal position and a change in an actual focal position.

FIGS. 10A, 10B, and 11 are diagrams explaining deviation between a change in a theoretical focal position and a change in an actual focal position.

Even when a focal position is controlled to move at an equal speed, as illustrated in FIG. 10A, by using a drive mechanism (a mechanism indicated by the reference numeral "M" in FIG. 9), a feeding amount of the drive mechanism and the speed of a drive actuator have unevenness. Therefore, an actual amount of a change in a focal position in an image frame or between image frames is not uniform, as illustrated in FIG. 10B. As described above, in the conventional technology, a focal position is obtained for each of the image frames, and an image is processed by using a certain focal position on the same plane (in the same image frame) as a representative focal position. Accordingly, a focal position at the time when luminance is obtained in each pixel in a frame deviates from a theoretical value (a value in a case in which speed does not have unevenness) due to unevenness of the speed of the drive mechanism, and the position of an estimated peak in the I-Z curve fluctuates, as illustrated in FIG. 11. This is a cause for a measurement error.

It is an object of the present invention to provide a technology for improving both a measurement accuracy and processing speed in a three-dimensional shape measuring apparatus that measures the three-dimensional shape of a specimen on the basis of a microscope image.

Embodiments of the present invention are described below in detail with reference to the drawings. In the description below, a laser scanning confocal microscope 100 is used as an example of a three-dimensional shape measuring apparatus according to the present invention.

First Embodiment (Configuration)

Figure 1:
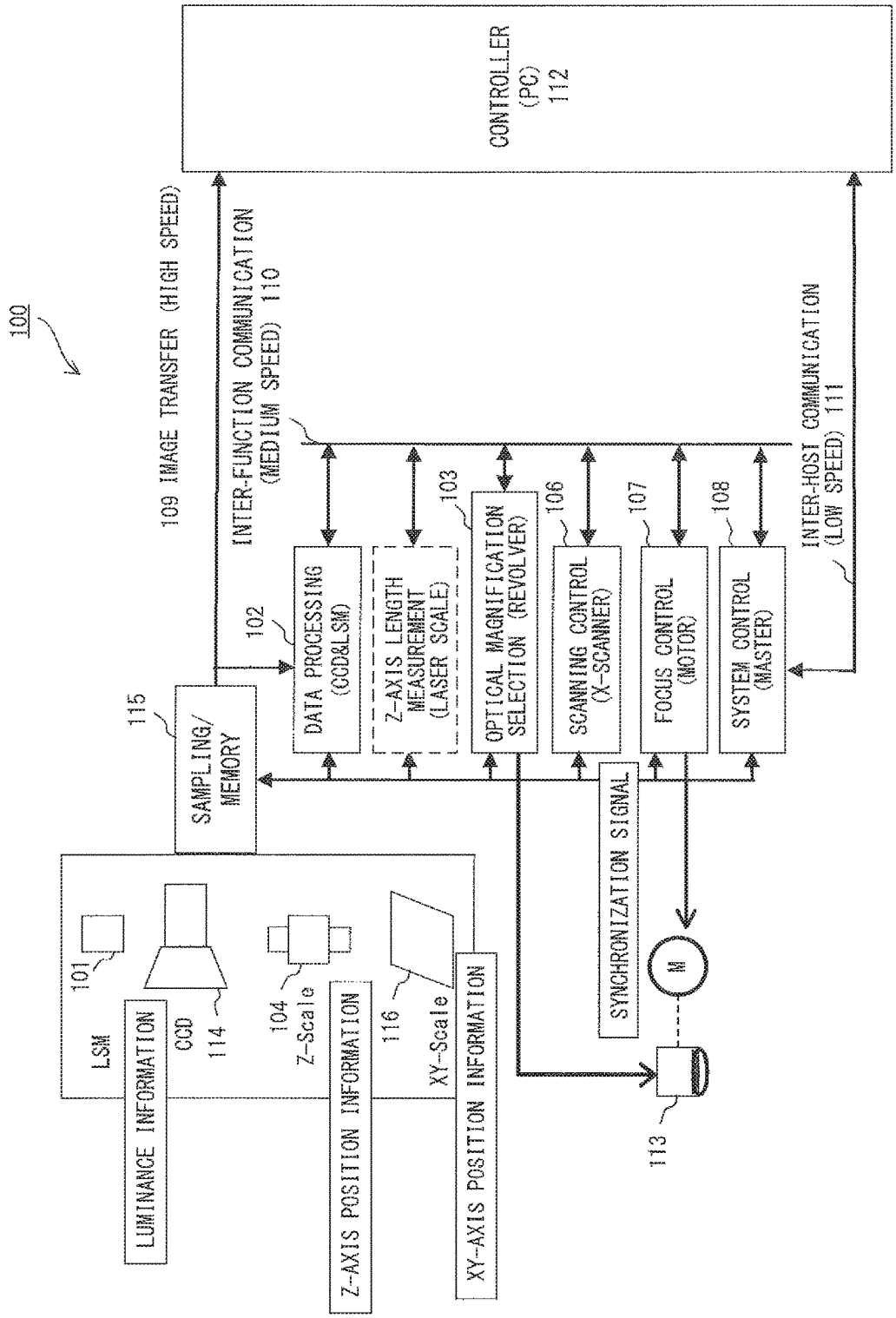
FIG. 1 illustrates an exemplary configuration of a laser scanning confocal microscope according to a first embodiment.

FIG. 1 illustrates an exemplary configuration of a laser scanning confocal microscope 100 according to this embodiment.

In the laser scanning confocal microscope 100 illustrated in FIG. 1, an optical sensor 101 is an optical sensor that detects reflected light from the surface of a specimen of a laser beam emitted from a light source (not illustrated). A CCD 114 is a color sensor that detects reflected light from the surface of the specimen of white light emitted from the light source. A Z-scale 104 is a position sensor that detects a position in an optical axis direction, namely, in a Z-axis direction, of a focus of an objective 113 (hereinafter referred to as a focal position). The Z-scale 104 is reset when the microscope 100 is started, and a movement history in the optical axis direction (the Z-axis direction) of the focal position after resetting is retained in a position counter (not illustrated) in FIG. 1. An XY-scale 116 is a position sensor that detects a position on an XY-plane of an XY-stage (not illustrated). The XY-scale 116 is reset when the microscope 100 is started, similarly to the Z-scale 104, and a movement history in an X-axis direction and a Y-axis direction of the position of the XY-stage after resetting is similarly retained in a position counter (not illustrated) in FIG. 1.

A sampling/memory unit 115 receives signals from the optical sensor 101, the CCD 114, the Z-scale 104, and the XY-scale 116, converts the signals into image data at the timing of a synchronization signal, and outputs the image data to an image transfer path 109. The image data is transferred to a controller 112 through the image transfer path 109.

The laser scanning confocal microscope 100 according to this embodiment converts signals received from the optical sensor 101 and the Z-scale 104 into image data, and outputs the image data to the controller 112. Processing that is performed on image data obtained by converting a signal received from the CCD 114 will be described in the description below of another embodiment. In this embodiment, a case in which only image data from the optical sensor 101 is processed is described.

A data processing unit 102 performs, for example, various settings of an imaging condition of an image signal obtained by the optical sensor 101 or the CCD 114, or the like, and signal processing for automatic focusing.

An optical magnification selecting unit 103 selects an objective 113 having an appropriate magnification from a revolver (not illustrated) that holds a plurality of objectives. The selected objective 113 is arranged on an optical path.

A scanning control unit 106 performs drive control on a scanner for an X-axis and a scanner for a Y-axis, and generates a synchronization signal synchronized with scanning. In this example, raster scanning is performed as laser scanning.

FIG. 2 illustrates a relationship between the synchronization signal generated by the scanning control unit 106 and the image data generated by the sampling/memory unit 115.

A frame valid signal FVAL is a vertical synchronization signal that reports a timing (vertical scanning) that corresponds to laser scanning of one frame. A line valid signal LVAL is a horizontal synchronization signal that reports a timing (horizontal scanning) that corresponds to laser scanning of one line.

A data valid signal DVAL is a synchronization signal that reports whether pixel data obtained during laser scanning is valid data. The data valid signal DVAL is actually a signal obtained by ANDing the data valid signal DVAL and a data valid signal DVAL(Y) indicating a valid line in a vertical scanning direction. The sampling/memory unit 115 recognizes a signal that is input during a period during which the data valid signals DVAL and DVAL(Y) illustrated in FIG. 2 are "valid" as an image signal for one frame.

Return now to the description of FIG. 1. A focus control unit 107 moves the position of the objective 113 in the optical axis (Z-axis) direction such that a focal position becomes variable.

A system control unit 108 controls a linkage operation of respective units in a microscope body, and the system control unit 108 is connected to the respective units via an inter-function channel 110. The system control unit 108 also controls processing for outputting image data and focal position data from the sampling/memory unit 115 to the image transfer path 109 in association with each other, but details will be described below.

The controller 112 controls the entirety of the laser scanning confocal microscope 100. A user of the microscope 100 can perform various operations on the microscope on an interface screen of the controller 112. As an example, the controller 112 performs a prescribed operation, or displays obtained image data on a display unit.

The system control unit 108 and the controller 112 are connected to each other via an inter-host channel 111. An operation that a user has performed via an interface is reported from the controller 112 via the inter-host channel 111 to the microscope body in the form of a command.

(Operation)

An operation for the laser scanning confocal microscope 100 having the configuration illustrated in FIG. 1 to generate image data is described below.

A signal from the optical sensor 101 that detects laser reflected light from a specimen is sampled as pixel data by the sampling/memory unit 115 in accordance with a synchronization signal that the scanning control unit 106 outputs at a timing that is synchronized with laser scanning. The pixel data is collected for each line of laser horizontal scanning, and is further collected for each line of laser vertical scanning. The collected pixel data of one frame is immediately transferred to the controller 112 via the image transfer path 109 having a high-speed wide band.

The movement of a focal position of the objective 113 is controlled by the focus control unit 107, as described in the description above of the configuration of the laser scanning confocal microscope 100, and a position detected by the Z-scale 104 is always grasped by a position counter (not illustrated). The sampling/memory unit 115 obtains a value of the position counter at the timing of the synchronization signal above, and stores the value as position information. Consequently, the sampling/memory unit 115 stores a position in the Z-axis direction at a timing at a confocal image is obtained.

Figure 3:
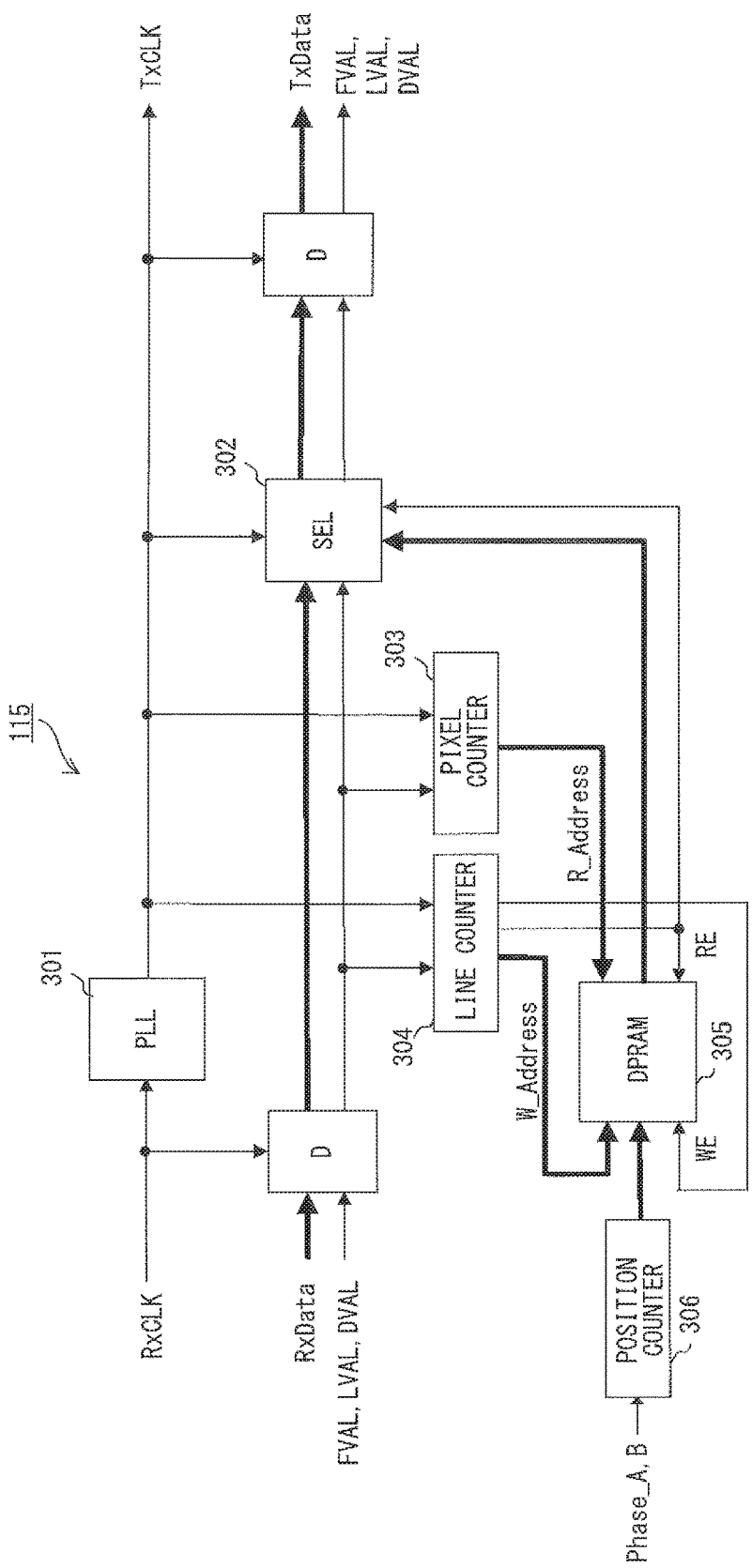
FIG. 3 illustrates details of a portion of the configuration of the sampling/memory unit.

FIG. 3 illustrates details of a portion of the configuration of the sampling/memory unit 115.

The sampling/memory unit 115 illustrated in FIG. 3 outputs pixel data and focal position data to the image transfer path 109 at respective prescribed timings in accordance with the synchronization signal illustrated in FIG. 2 that is generated by the scanning control unit 106. A thick solid line in this drawing indicates the flow of the pixel data or the focal position data, and a thin solid line indicates the flow of a synchronization signal.

Specifically, a phase locked loop (PLL) 301 of the sampling/memory unit 115 generates a signal TxCLK that determines an output timing (a phase) of the image transfer path 109 that is synchronized with the timing (RxCLK) of input pixel data as a reference.

The timing of a signal RxDATA that has been input from the optical sensor 101 is adjusted according to synchronization signals (FVAL, LVAL, DVAL, and RxCLK) from the scanning control unit 106. The signal RxDATA for which the timing has been adjusted passes through a selector (SEL) 302, and is output as output data TxDATA to the image transfer path 109.

A pixel counter 303 counts the number of valid pixels that pass through the selector 302 during a period during which a data valid signal DVAL of one line of horizontal scanning has been set to be "valid", in accordance with the signal TxCLK and the synchronization signal from the scanning control unit 106. A line counter 304 counts the number of valid lines that pass through the selector 302 during a period during which a data valid signal DVAL(Y) in a vertical scanning direction has been set to be "valid", similarly in accordance with the signal TxCLK and the synchronization signal from the scanning control unit 106. When a counter value of the line counter 304 is a prescribed value (the number of lines in one frame of an image), a dual port RAM (hereinafter referred to as a DPRAM) 305 switches writing control WE and reading control RE, and the selector 302 performs switching.

A position counter 306 counts an encoder signal Phase_A,B that is output by the Z-scale 104 of FIG. 1 that detects a position in the Z-axis direction. A value of the encoder signal Phase_A,B indicates a focal position of the objective 113 with respect to a Z-axis coordinate. In the DPRAM 305, a value of the line counter 304 is connected to a writing address W_Address of the DPRAM 305, a value of the position counter 306 is connected to writing data of the DPRAM 305, and a value of the pixel counter 303 is connected to a reading address R_Address of the DPRAM 305. Reading data from the DPRAM 305 is connected to the selector 302.

The selector 302 switches pixel data from the optical sensor 101 and the reading data from the DPRAM 305 in accordance with an instruction from the line counter 304, and outputs either of the pixel data and the reading data to the image transfer path 109. Before the wring control WE and the reading control RE are switched and before the selector 302 performs switching, a value of the position counter 306 is written to the DPRAM 305, as described above. After switching is performed, a value stored in the DPRAM 305 is input into the selector 302, and is output to the image transfer path 109 via the selector 302.

Detailed operation procedure in which the sampling/memory unit 115 illustrated in FIG. 3 outputs data to the image transfer path 109 is described. When an image frame is started, the line counter 304 and the pixel counter 303 are first reset to initial values. The selector 302 performs setting to transfer pixel data from the optical sensor 101.

A counter value of the position counter 306 is stored in the DPRAM 305 at a timing at which a data valid signal DVAL is started (rises). At a timing at which each line is finished, namely, at a timing at which the data valid signal DVAL is finished (falls), the pixel counter 303 is reset, and the line counter 304 is counted up. A counted-up value of the line counter 304 indicates the next writing address of the DPRAM 305. As described above, in this embodiment, the selector 302 sequentially stores, in the DPRAM 305, a focal position at a timing at which the data valid signal DVAL is started, namely, at a timing at which each of the lines is started, while the selector 302 is transferring the pixel data from the optical sensor 101, as described above.

While the pixel data is passing through the selector 302 and when a value of the line counter 304 becomes a value that corresponds to the number of lines, the sampling/memory unit 115 switches an input to the selector 302 to reading data from the DPRAM 305.

At a timing at which the input to the selector 302 is switched to the reading data from the DPRAM 305, a focal position that was obtained at a starting timing of the data valid signal DVAL of each of the lines is stored in the DPRAM 305. As illustrated by the frame valid period FVAL of FIG. 2, there is time to spare after pixel data of one frame is transmitted and before pixel data of the next frame starts to be transmitted. Accordingly, the sampling/memory unit 115 outputs focal position data of each of the lines to the image transfer path 109 within a period during which the frame valid signal FVAL has been set to be "valid" after the transmission of pixel data of a certain frame.

Figure 4A:
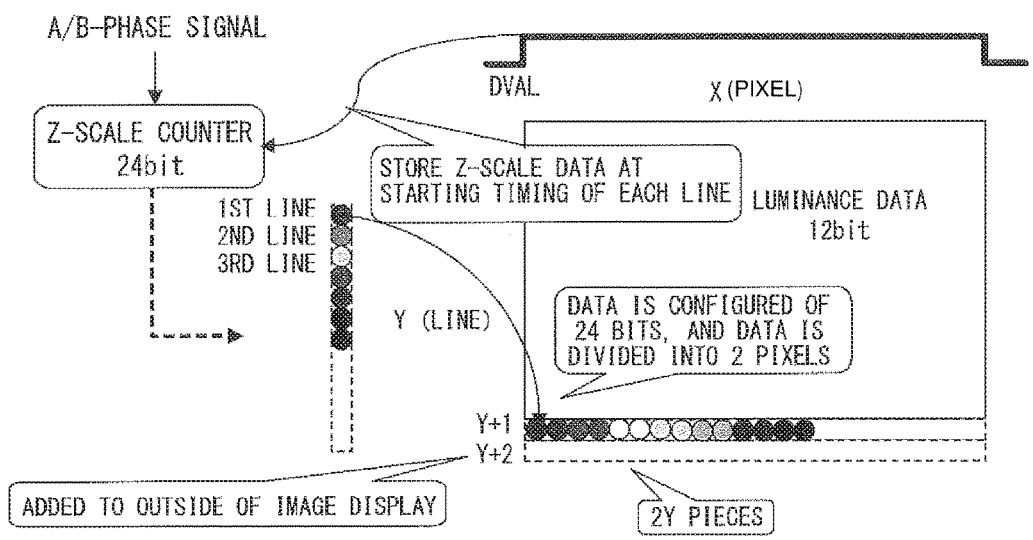
FIGS. 4A and 4B illustrate specific examples of a method for storing a focal position in a DPRAM and a method for outputting the focal position to an image transfer path that are performed by the sampling/memory unit according to the first embodiment.
Figure 4B:
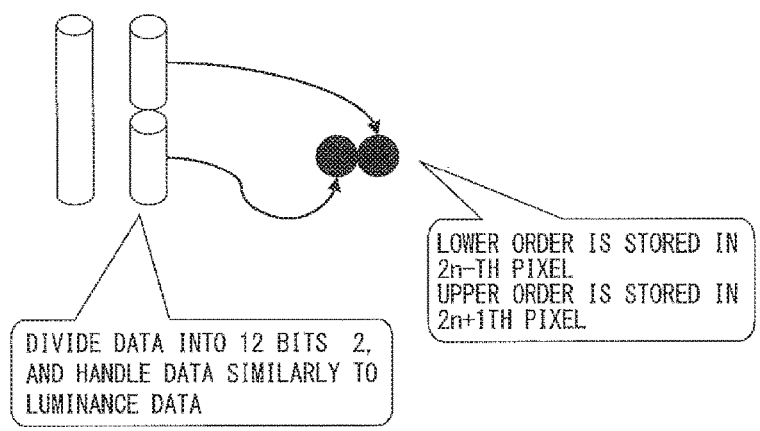

FIGS. 4A and 4B illustrate specific examples of a method for storing a focal position in the DPRAM 305 and a method for outputting the focal position to the image transfer path 109 that are performed by the sampling/memory unit 115 according to this embodiment. Here, a case is described as an example in which the color gradation of pixel data is expressed by 12 bits, as illustrated in FIG. 4A, and a data length of the position counter 306, namely, the size of pixel position data, is 24 bits, as illustrated in FIG. 4B. It is assumed that an input to the DPRAM 305 is 24 bits and that an output from the DPRAM 305 is 12 bits.

In this case, data of the position counter 306 that is obtained for a certain line corresponds to 2 pixels of image data. Accordingly, the sampling/memory unit 115 divides a value of the position counter 306 for each of the lines that was obtained at a prescribed timing (a starting timing of the data valid signal DVAL in this example) into two pieces sequentially from a leading address of the DPRAM 305, and stores the divided pieces. As illustrated in FIG. 4B, lower-order 12 bits of the n-th (n=1, 2, 3, ... ) value of the position counter 306, namely, lower-order 12 bits of the focal position data of the n-th line, are stored in the 2n-th address from the top, and upper-order 12 bits are stored in the 2n+1th address.

When the sampling/memory unit 115 completes storing a prescribed number of values of the position counter 306 that corresponds to the number of valid lines in the vertical scanning direction, the sampling/memory unit 115 starts an operation to output stored data to the image transfer path 109. Specifically, the sampling/memory unit 115 starts an operation to read focal position data sequentially from the leading address of the DPRAM 305 by using the next data valid signal DVAL as a trigger, and to output the focal position data to the image transfer path 109 via the selector 302. In addition, the selector 302 performs switching so as to select a direction in which reading data from the DPRAM 305 passes through the selector 302.

In outputting the focal position data read from the DPRAM 305, the line counter 304 and the pixel counter 303 perform operations that are similar to those in outputting pixel data. Stated another way, the pixel counter 303 counts the number of pixels that pass through the selector 302, and the line counter 304 counts the number of lines in accordance with the signal TxCLK and the synchronization signal from the scanning control unit 106. The sampling/memory unit 115 sequentially reads a prescribed number of pieces of data (that corresponds to the number of lines in an image) that have been stored in the DPRAM 305, and outputs the data to the image transfer path 109, by using the pixel counter 303 and the line counter 304.

In this example, a piece of focal position data is configured of bits for 2 pixels (24 bits). Therefore, when it is assumed that the number of pixels in one line of an image is X and that the number of lines is Y, the number of lines needed to transfer a reading control signal (RE) of the DPRAM 305 is expressed according to the following expression.

$$2 \times Y \text{(the number of lines)}/X \text{(the number of pixels)}$$

In the expression above, a fraction is rounded up.

As an example, when image data for 1024 lines is transferred, a period during which the data valid signal DVAL(Y) has been set to be invalid in a period during which the frame valid signal FVAL is valid exists in image data for about 10 respective lines before and after a period during which the data valid signal DVAL(Y) is valid. In the example above, 2 (=2×1024/1024) lines are needed to transfer the focal position data, and therefore the focal position data can be transferred via the image transfer path 109 within the period during which the data valid signal DVAL(Y) has been set to be invalid in the period during which the frame valid signal FVAL is valid, by using the method above.

The controller 112 on a data receiver side recognizes a prescribed number of pieces of data that corresponds to the number of valid lines in the vertical scanning direction as pixel data, and recognizes data for the next line as the focal position data. In the example above, data for the 1st to Y-th lines is processed as pixel data, and each of data for the Y+1th line and data for the Y+2th line is processed as focal position data for the 1st to Y-th lines sequentially from the top.

In the controller 112, information indicating the position of focal position data of a series of data that is received via the image transfer path 109 has been set in advance. The information indicating the position of the focal position data is set by a user selecting the size of an image or the like, for example, when the laser scanning confocal microscope 100 starts measuring a specimen. The controller 112 references the information indicating the position of the focal position data, and extracts the focal position data from the data that has been received as pixel data via the image transfer path 109. Consequently, information relating to a focal position in which pixel data for each of the lines in an image frame was obtained can be obtained in real time.

As described above, by employing the laser scanning confocal microscope 100 according to this embodiment, a confocal image is photographed while changing a relative distance between the objective 113 and a specimen, namely, while moving a focal position. At this time, focal position data is sampled for each line, is stored in the DPRAM 305, and is transferred to the controller 112 via the image transfer path 109 that is used to transfer pixel data. The focal position data is transferred within a period that is not used to transfer image data in a period during which the frame valid signal FVAL has been set to be "valid". An effect of measuring a three-dimensional shape by using the focal position data transferred in the manner above is described with reference to the drawings.

In the example above, focal position data is transferred within a period after the transfer of image data in a period during which the frame valid signal FVAL of the synchronization signals generated by the scanning control unit 106 has been set to be "valid". However, the focal position data is transferred, for example, within a period before the transfer of image data. In this case, focal position data for each of the lines of a certain frame can be stored in the DPRAM 305, and a period before the transfer of image data of the next frame can be used.

Figure 5:
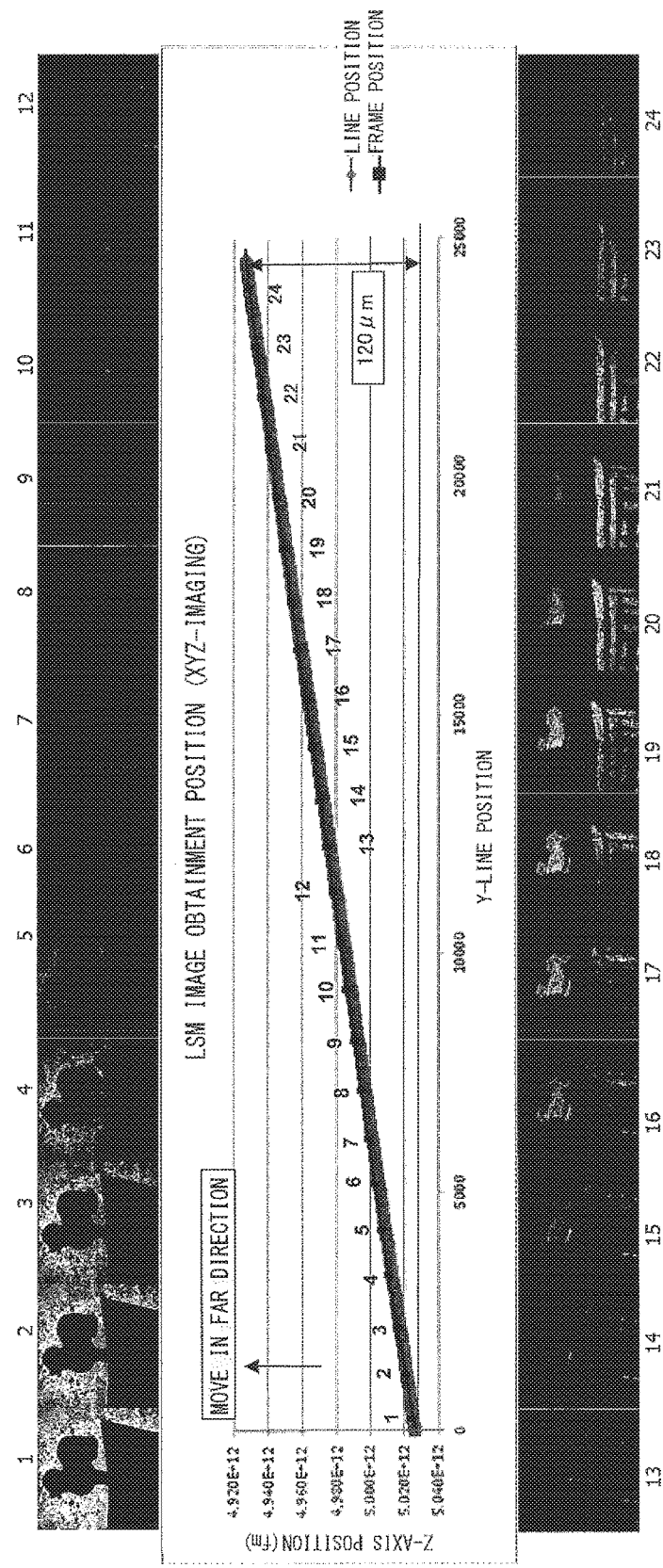
FIG. 5 is a diagram explaining an effect of a method for measuring a three-dimensional shape by using the laser scanning confocal microscope according to the first embodiment.
Figure 8:
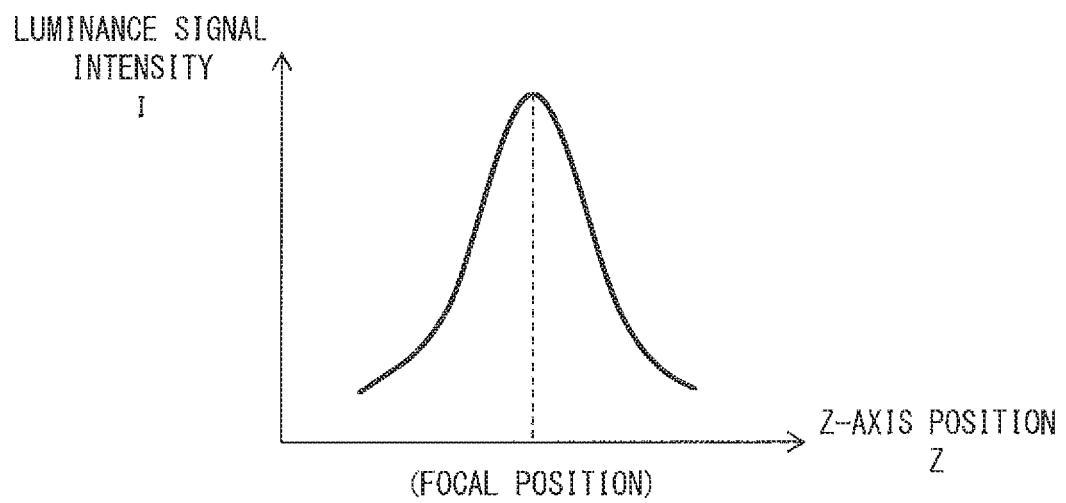
FIG. 8 illustrates a curve called an I-Z curve.

FIG. 5 is a diagram explaining an effect of a method for measuring a three-dimensional shape by using the laser scanning confocal microscope 100 according to this embodiment.

FIG. 5 illustrates images of 24 frames that are obtained by performing imaging while changing a focal position, and a graph illustrating the position of a line and the position of a frame at each point in time during imaging. As described above, in this embodiment, data of the position counter 306 is sampled, and is stored in the DPRAM 305 at a timing at which each of the lines is started. A value of the position counter 306 that is obtained at the starting timing of each of the lines is indicated as a "line position" in FIG. 5. In FIG. 5, a "frame position" indicates a position coordinate in the Z-axis direction of each of 24 frame images, and the "frame position" is a value that is obtained by sampling the position counter 306 at a timing at which (the first line in) each of the frames is started. A graph indicating the line position illustrates a prescribed number of line positions that corresponds to the number of lines (for example, 1024 lines) in a frame, between a certain frame position (for example, a frame position having the frame number "1") and the next frame position (for example, a frame position having the frame number "2").

When imaging is started, a relative distance between the objective 113 and a specimen is gradually increased until capturing an image having the frame number "1" to an image having the frame number "24" is completed. The graph of FIG. 5 illustrates that the laser scanning confocal microscope 100 according to this embodiment obtains one frame position per frame, and obtains one line position per line in the frame. The relative distance between the objective 113 and the specimen changes by about 120 µm (in a direction in which the relative distance increases) after capturing an image having the frame number "1" is started and before capturing an image having the frame number "24" is completed. As illustrated by frame images in FIG. 5, a focused portion changes due to a change in the relative distance between the objective 113 and the specimen, and a confocal image also changes. The controller 112 generates a three-dimensional shape on the basis of image data and focal position data (an image of each of the frames illustrated in FIG. 5).

Generally in a conventional technology, a pieces of focal position data is obtained for each frame, and a controller estimates a peak position in the I-Z curve according to the focal position data so as to generate a three-dimensional shape. According to this embodiment, a focal position is obtained for each line in a frame.

The focal position for each of the lines is transferred to the controller 112 within a period that is not used to transfer image data in a period during which the frame valid signal FVAL has been set to be valid, as described above. According to this embodiment, focal position data for each of the lines needs to be transferred, and an amount of information increases, compared with the conventional technology in which focal position data is obtained and transferred for each of the frames. However, according to this embodiment, the focal position data is transferred within a period that is not used to transfer image data via the image transfer path 109 having a high-speed wide band, namely, between image data of a certain frame and image data of the next frame. Accordingly, a large amount of information can be transferred without giving any influence on the transfer of image data. The controller 112 receives focal position data associated with pixel data immediately after pixel data for one frame via the image transfer path 109 having a high-speed wide band. Consequently, the speed of three-dimensional shape measuring processing can be improved.

FIGS. 6A and 6B are other diagrams explaining an effect of a method for measuring a three-dimensional shape by using the laser scanning confocal microscope 100 according to this embodiment. FIG. 6A illustrates a relationship between a position coordinate in the Z-axis direction and a line position of an image in a case in which a focal position is stationary (a case in which a relative distance between the objective 113 and a specimen is constant). FIG. 6B illustrates the relationship in a case in which the focal position is moving (a case in which the relative distance changes). In both of the graphs of FIGS. 6A and 6B, a vertical axis indicates a position in the Z-axis direction, and a horizontal axis indicates a position in a Y-direction of a frame, namely, a line position.

In a case in which the focal position is stationary, the position in the Z-axis direction has a fixed value, regardless of the line position, as illustrated in FIG. 6A. When a user changes the focal position, the position in the Z-axis direction that is detected by the Z-scale 104 changes in the middle of an image. At this time, a focal position given to each of the lines of a confocal image indicates a history of the change above, as illustrated in FIG. 6B. Stated another way, in the conventional technology, a three-dimensional shape is calculated in one representative Z-axis position in a frame. Strictly speaking, the representative Z-axis position deviates from the position of the Z-scale 104 in a case in which a focal position always changes while measuring a three-dimensional shape. Accordingly, a movement speed (an inter-frame pitch) that can ignore this deviation needs to be set. However, according to this embodiment, a focal position is obtained for each of the lines, and a restriction on the movement speed can be relaxed.

According to this embodiment, a focal position is obtained for each of the lines when image data is obtained, and therefore the controller 112 can perform an operation to generate a three-dimensional shape simultaneously with imaging. The speeding-up of processing can be realized without receiving influence on a band of a communication system, as conventional. Further, even when the speed of movement of the focal position is uneven, the accuracy of the estimation of a peak position in the I-Z curve is improved because the focal position is obtained for each of the lines. Accordingly, by employing the laser scanning confocal microscope 100 according to this embodiment, both a measurement accuracy and processing speed can be improved.

(Variation 1)

In the embodiment above, focal position data of each of the lines is transferred after image data of each of the frames is transmitted. However, a timing of the transfer of the focal position data is not limited to this. As an example, focal position data of each of the lines can be transferred every time pixel data of a corresponding line is transferred.

In this variation, the sampling/memory unit 115 of FIG. 3 obtains focal position data at a timing at which the valid image data signal DVAL of FIG. 2 is started (rises), and stores the focal position data in the DPRAM 305. In this respect, this variation is similar to the embodiment described above. However, in this variation, the sampling/memory unit 115 allocates and transfers the focal position data stored in the DPRAM 305 at a timing at which the valid image data signal DVAL is finished (falls).

Schematically illustrated in FIG. 2, a period during which the line valid signal LVAL is "valid" is set to be longer than a period during which the data valid signal DVAL is valid. As an example, in a case in which the number of pixels on one line is 1024, a period during which the line valid signal LVAL is valid and the data valid signal DVAL is invalid that corresponds to 10-100 order pixels exists before and after a period during which the data valid signal DVAL is valid. In the example above, focal position data of each of the lines corresponds to 2 pixels. Therefore, the focal position data can also be transferred via the image transfer path 109 within the period during which the line valid signal LVAL is valid and the data valid signal DVAL is invalid, similarly to the embodiment above.

By employing the configuration above, a prescribed number of pieces of focal position data that corresponds to the number of lines that configure one frame do not need to be stored in the DPRAM 305, and a capacity of the DPRAM 305 can be reduced, compared with the embodiment above.

(Variation 2)

In the embodiment above, focal position data is transferred after pixel data for one frame is transferred. In variation 1, the focal position data is transferred after pixel data for one line is transferred. Focal position data can be transferred every time each corresponding pixel data is transferred, as in this variation.

Examples of a specific method for transferring a focal position every time corresponding pixel data is transferred include a method for setting a frequency at the timing of pixel data input into the sampling/memory unit 115 to an integral multiple, and a method using a return path of laser scanning using raster scanning. As an example, in a case in which the frequency of RxCLK is doubled, pixel data for one line is transferred within one half of a conventional period (the first half of the period of RXCLK having a doubled frequency), and focal position data is transferred within the remaining period (the latter half of the period of RxCLK).

By using these methods, an amount of data that can be transferred during a period that is allocated to transfer one frame of image can be increased, and focal position data can be given to each pixel, and is transferred to the controller 112, although the focal position data is given to each line in the embodiment above or variation 1.

According to the embodiment above or variation 1, focal position data is obtained for each of the lines, and is used to measure a three-dimensional shape. According to this variation, focal position data is obtained for each of the pixels, and is used to measure a three-dimensional shape. Consequently, the accuracy of measuring a three-dimensional shape can be improved without affecting the processing speed of the laser scanning confocal microscope 100.

Second Embodiment

The laser scanning confocal microscope 100 according to the first embodiment above transfers only image data obtained by the optical sensor 101 to the controller 112. According to this embodiment, image data obtained by the CCD 114 of FIG. 1, in addition to the data obtained by the optical sensor 101, is transferred to the controller 112. In addition, data is obtained from the XY-scale 116 in addition to the Z-scale 104, and the data is transferred to the controller 112.

Differences of a laser scanning confocal microscope according to this embodiment from that in the embodiment above are principally described below.

(Configuration)

The configuration of the laser scanning confocal microscope according to this embodiment is similar to that in the first embodiment above, and the configuration is illustrated in FIG. 1.

In a case in which the laser scanning confocal microscope 100 handles image data of a camera (the CCD 114), as in this embodiment, a respect wherein an image of the camera is exposed and transferred at different timings needs to be taken into consideration. Namely, exposure and data transfer are performed at different timings, and the transfer of image data is performed later than exposure by one frame. Accordingly, in this embodiment, position counter data of the Z-scale 104 for 2 frames needs to be stored. Data for the first frame of the position counter data for the 2 frames, namely, data that has been stored earlier is read.

Considering that the CCD 114 simultaneously exposes all of the pixels, a minute displacement portion of pixel data is integrated when a focal position moves in a Z-direction. Accordingly, in the embodiment above, a focal position obtained at a timing at which a line is started is used, but in this embodiment, a focal position is not limited to this, and a focal position obtained by using another method can be used. As an example, an average value of position counter data that has been given to each of the lines in one frame may be calculated, and the average value may be used as a representative focal position at a timing at which the frame is exposed.

(Operation)

FIGS. 7A, 7B, and 7C illustrate specific examples of a method for storing a focal position and XY coordinates in the DPRAM 305 and a method for outputting the focal position and the XY coordinates to the image transfer path 109 that are performed by the sampling/memory unit 115 according to this embodiment. As illustrates in FIG. 7B, the data length of the position counter 306 of the Z-scale is 24 bits. This is similar to that in the case described above with reference to FIGS. 4A and 4B. However, it is assumed here that a color gradation of image data is expressed by 8 bits for each of RGB, as illustrated in FIG. 7A, and that the data length for each of an X-axis and a Y-axis of a position counter of the XY-scale 116 is 32 bits, as illustrated in FIG. 7C. It is assumed that an input to the DPRAM 305 is 24 bits, similarly to the first embodiment, and that an output from the DPRAM 305 is 8 bits.

In this example, in a case in which image data from the CCD 114 is data of 24-bit color (RGB), the data length of focal position data, namely, the position counter 306 of the Z-scale 104, is also 24 bits, and this corresponds to 3 pixels. The sampling/memory unit 115 divides and stores a value of the position counter 306 for each of the lines that was obtained at a prescribed timing into three pieces sequentially from a leading address of the DPRAM 305. As illustrated in FIG. 7B, in the n-th (n=1, 2, 3, . . . ) value of the position counter 306, namely, focal position data of the n-th line, lower-order 8 bits are stored in the 3n-th address from the top, middle-order 8 bits are stored in the 3n+1th address, and upper-order 8 bits are stored in the 3n+2th address.

The sampling/memory unit 115 outputs the data stored in the DPRAM 305 to the image transfer path 109 at the timing and the method described in the first embodiment above or the variations thereof. Specifically, data that has been read sequentially from the leading address of the DPRAM 305 is divided into three pieces (8 bits×3), and the data is transferred to the controller 112 as data that corresponds to 3 pixels.

With respect to position counter data of the XY-scale 116, a data length for each axis, namely, each of the X-axis and the Y-axis, is 32 bits in this example, and therefore the position counter data is divided and stored into 4 pieces (8 bits×4). As illustrated in FIG. 7C, a data length for each axis corresponds to 2 pixels, and data for 2 axes, the X-axis and the Y-axis, occupies 4 pixels. This is because RGB image data has a data length of 24 bits (8 bits×3) per pixel, and 32 bits that is a data length per axis of the position counter data of the XY-scale 116 occupies 2 pixels (48 bits).

The sampling/memory unit 115 stores the position counter data of the XY-scale 116 in the DPRAM 305 after the sampling/memory unit 115 stores the position counter data of the Z-scale 104 by using the method above.

Here, the local counter data of the Z-scale 104 and the position counter data of the XY-scale 116 are different from each other in that the position counter data of the Z-scale 104 can change while obtaining image data of a certain frame, but that the position counter data of the XY-scale 116 does not change while imaging a certain image frame. A three-dimensional shape measuring apparatus such as the laser scanning confocal microscope 100 obtains image data while moving the focal position of the objective 113, and therefore a position in the Z-axis direction changes while imaging one frame. However, positions in the X-axis direction and the Y-axis direction are fixed (stationary) as a field of view, and therefore the positions in the X-axis direction and the Y-axis direction do not basically change while imaging one frame. In particular, in imaging by using a camera, all of the pixels are simultaneously exposed, and a frame rate is sufficiently higher than the movement speed of the XY-stage.

Therefore, one piece of position counter data (position information in the X-axis direction and the Y-axis direction) of the XY-scale 116 has only to be given to each image frame. Accordingly, in this example, the position counter data of the XY-scale 116 is obtained for each of the frames at a prescribed timing, and the position counter data is transferred to the controller 112. Specifically, the position counter data of the XY-scale 116 can be obtained, for example, at the timing of the termination of the frame valid signal FVAL of a previous image frame or the timing of the commencement of the frame valid signal FVAL of a current frame immediately after the termination of exposure. The obtained data is stored in the DPRAM 305 after the position counter data of the Z-scale, as described above, and X-axis data an Y-axis data that each correspond to 2 pixels are transferred after the focal position data.

Even when focal position data is transferred every time pixel data for one line is transferred, or every time pixel data for one pixel is transferred, as in variations 1 and 2 of the first embodiment, X-axis position data and Y-axis position data can be transferred after the pixel data and the focal position data are transferred. Consequently, an effect that is similar to the effect of variation 1 or 2 of the first embodiment can be realized even by employing a configuration in which image data of a camera is handled, as in this embodiment.

The laser scanning confocal microscope 100 according to this embodiment can also transfer position information of the XY-stage to the controller 112 via the image transfer path 109 having a high-speed wide band in association with image data. Position information of three axes, XYZ axes, is needed to process optical luminance information obtained by imaging by using a camera (the CCD 114) and to obtain image data. In this embodiment, the sampling/memory unit 115 transfers the position information of the three axes, the XYZ axes, in association with the optical luminance information, and therefore the controller 112 can obtain mapping of the position information of the three axes, the XYZ axes, and the optical luminance information in real time. The controller 112 does not need to wait until the controller 112 receives position information, as in a conventional technology, and therefore obtained image data can be processed more rapidly, and can be displayed on a display unit.

The embodiment above has been described by using, as an example, a case in which image data is 24-bit color data including respective 8 bits of RGB, the length of position counter data of the Z-scale is 24 bits that is the same as the length of image data, and the length for each of an X-axis and a Y-axis of position counter data of the XY-scale is 32 bits. However, this embodiment is not limited to this. The length of the position counter data of each of the Z-scale and the XY-scale is converted into pixels, and how many pixels the length of the position counter data corresponds to is obtained such that how may pixels or how may lines the focal position data or the position data in the XY-axis direction in total corresponds to according to the size of a frame is obtained. In the laser scanning confocal microscope 100, how many pixels (how many lines) the focal position data or the position data in the XY-axis direction corresponds to, and how the focal position data or the position data in the XY-axis direction will be transferred in association with the pixel data have been set. By doing this, similar processing can be performed in a data transmitter side (the sampling/memory unit 115) and a data receiver side (the controller 112).

The above two embodiments have been described by using an example in which information that is transmitted via the image transfer path 109 in association with image data is information such as focal position or position in the XY-axis direction, but the present invention is not limited to this. Various types of control information that has been set at the time of capturing an image may be transmitted in association with image data. Examples of control information that is not information such as focal position or position in the XY-axis direction include information such as an image capturing mode, a magnification of an objective, an exposure time, a zoom, an image size, a thinning rate of image data, a frame number, illumination intensity, detection sensitivity of various sensors, an offset value of a background level, or a maximum value and a minimum value of luminance. Processing speed can be improved by transferring the control information above via the image transfer path 109 in association with image data.

(Variation 1)

In the embodiment above, the controller 112 receives control information such as focal position data via the image transfer path 109, and performs processing such as the generation of a three-dimensional image by using the control information. The DPRAM 305 that has stored the focal position data or the like is read at the timing of a synchronization signal of an image frame, as described above.

Meanwhile, in this variation, a portion of the DPRAM 305 is connected as a register of a microcomputer that manages control information of a system. By doing this, the controller 112 can immediately obtain control information used in the system, such as an imaging condition, as control information associated with image data. Consequently, processing speed can be further improved.

Thus, according to the present invention, both measurement accuracy and processing speed can be improved in a three-dimensional shape measuring apparatus that measures a three-dimensional shape of a specimen from a microscope image.

The present invention is not limited to the embodiments above with no change, and components can be varied and embodied without departing from the gist of the embodiments above in an implementing stage. Various inventions can be made by appropriately combining a plurality of components disclosed in the embodiments above. As an example, all of the components disclosed in the embodiments may be appropriately combined. Further, components disclosed in different embodiments may be appropriately combined. It goes without saying that various variations or applications can be made without departing from the spirit of the invention.

What is claimed is:

1. A three-dimensional shape measuring apparatus comprising:
    a light source;
    an objective that condenses light emitted from the light source;
    a stage on which a specimen is placed;
    a scanner that two-dimensionally scans light that is condensed by the objective and is illuminated on the specimen;
    an optical sensor that receives light that has been illuminated via the objective and has been reflected by the specimen; and
    a processor that includes hardware, the processor being configured to perform control to:
    image a sensor signal from the optical sensor;
    store, in a memory, control information indicating a state of the three-dimensional shape measuring apparatus at a point in time of imaging, the control information being obtained in synchronization with the imaging of the sensor signal; and
    control a transfer timing of the control information stored in the memory in accordance with a transfer timing of image data obtained by the imaging so as to output the control information to an image transfer path in association with the image data.

2. The three-dimensional shape measuring apparatus according to claim 1, wherein the processor performs control to:
    store, in the memory, a focal position in an optical axis direction as the control information, and
    output data of the focal position in the optical axis direction that has been stored in the memory, in association with the image data at a timing at which the focal position was obtained.

3. The three-dimensional shape measuring apparatus according to claim 1, wherein the processor performs control to:
    store, in the memory, an imaging position on a two-dimensional plane as the control information, and
    output data of the imaging position on the two-dimensional plane that has been stored in the memory, in association with the image data at a timing at which the imaging position was obtained.

4. The three-dimensional shape measuring apparatus according to claim 1, wherein:
    the processor is further configured to perform control to generate a synchronization signal at a time of two-dimensionally scanning light by the scanner, the optical sensor is arranged in a position conjugate to a focal position of the objective, and the optical sensor is included in a confocal diaphragm that receives light that has been illuminated via the objective and has been reflected by the specimen, the processor performs control to store, in the memory, the control information of the three-dimensional shape measuring apparatus at a time of capturing an image, the control information being obtained in synchronization with the imaging performed on the sensor signal, and the processor performs control to output the control information needed to generate the confocal image in association with the image data.

5. The three-dimensional shape measuring apparatus according to claim 4, wherein the processor performs control to store, in the memory, the control information that is obtained for each scanning of each image frame in accordance with the generated synchronization signal.

6. The three-dimensional shape measuring apparatus according to claim 4, wherein the processor performs control to store, in the memory, the control information that is obtained for each scanning of each line in an image frame in accordance with the generated synchronization signal.

7. The three-dimensional shape measuring apparatus according to claim 4, wherein the processor performs control to store, in the memory, the control information that is obtained for each scanning of each pixel in an image frame in accordance with the generated synchronization signal.

8. The three-dimensional shape measuring apparatus according to claim 1, wherein the processor performs control to output the control information to the image transfer path within a valid period of a synchronization signal indicating a reading timing of the sensor signal.

9. The three-dimensional shape measuring apparatus according to claim 8, wherein the processor performs control to output the control information in association with image data of each frame within a period that is not used to transfer the image data in a valid period of a vertical synchronization signal of synchronization signals generated at a time of scanning by the scanner.

10. The three-dimensional shape measuring apparatus according to claim 8, wherein the processor performs control to output the control information in association with data of each line in a frame within a period that is not used to transfer image data in a valid period of a horizontal synchronization signal of synchronization signals generated at a time of scanning by the scanner.

11. The three-dimensional shape measuring apparatus according to claim 8, wherein the processor performs control to output the control information in association with data of each pixel within a cycle of a synchronization signal generated at a time of scanning by the scanner, or a period of a return path of an XY-scan.

12. The three-dimensional shape measuring apparatus according to claim 1, further comprising:

a controller that processes the control information and the image data that have been associated and transferred via the image transfer path so as to measure a three-dimensional shape, wherein:

the processor performs control to perform mapping by inserting the control information stored in the memory into the image data in accordance with a prescribed arrangement condition, and the controller decrypts the control information, and processes the image data that corresponds to the control information, in accordance with the prescribed arrangement condition.

* * * * *